J. T. CODMAN.
FURNITURE-CASTER.
No. 175,853. Patented April 11, 1876.
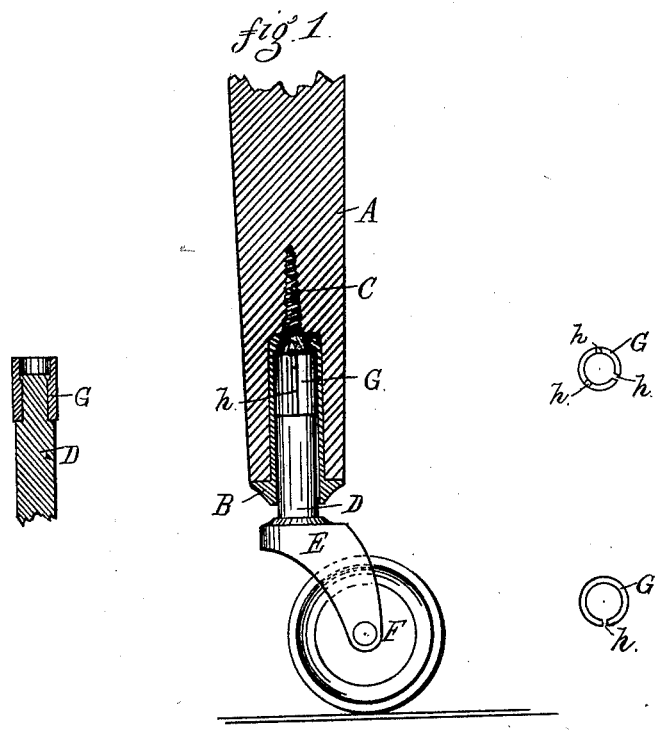

UNITED STATES PATENT OFFICE.

JOHN T. CODMAN, OF BOSTON, MASSACHUSETTS.

IMPROVEMENT IN FURNITURE-CASTERS.

Specification forming part of Letters Patent No. 175,853, dated April 11, 1876; application filed August 9, 1875.

*To all whom it may concern:*

Be it known that I, JOHN T. CODMAN, of Boston, county of Suffolk, State of Massachusetts, have invented a new and useful Improvement in Casters; and I do hereby declare that the following, taken in connection with the drawings which accompany and form part of this specification, is a description of my invention sufficient to enable those skilled in the art to practice it.

My present invention is an improvement on that patented to me June 29, 1875, No. 164,973. In that patent the pintle is conical or tapering at its tip, and this tip centers and rests in the countersunk head of a screw or fastening which holds the hollow socket to place in the wood. In my present invention I dispense with the tapering tip, and, consequently, with the countersinking of the screw-head, and instead thereof I employ, on the extremity of the pintle, a collar or sleeve, so applied as to project beyond the end of the pintle, this collar having one or more longitudinal scores or cuts therein, as hereinafter described, and the end of this collar when the pintle is inserted into the socket for use, bearing against the head of the socket or socket-fastener, while the sides of the collar hold tightly by frictional contact against the inner sides of the socket, leaving the pintle free to turn in the collar.

In the accompanying drawings, A represents a leg of any piece of furniture with my improved caster applied thereto; B, the hollow socket inserted in the leg, and held thereto by means of a single ordinary screw or equivalent fastener, C. D is the pintle; E, the truck, and F the roller. The pintle is made of considerably-reduced diameter at and near its tip, and a collar, G, of slightly larger diameter than the pintle, is applied thereon, and so held as to be free to turn loosely thereon. This collar extends considerably beyond the extremity of the pintle, so that this latter never can have its end rest or bear against the head of C or against the bottom of the socket, and consequently it has no bearing-contact at this point to prevent its free revolution; on the contrary, there is nothing to impede its free-turning movement, except its necessary frictional bearing in and on the collar G. This collar is provided with one or more scores, slits, or cuts, *h*, which allow of slightly expanding or spreading it, as may be requisite to insure the proper degree of tight fitting within the socket. The resilience of the collar permits of its being contracted slightly by the act of pushing it to its place in the socket.

The collar I prefer to make of brass, as brass and iron run together better than iron upon iron.

When the caster is in place the outer end of the pintle holds the truck a little distance off from the lower end of the socket, to allow for the wear which may take place on the lower end of the collar where it bears upon the shoulder of the pintle. No wear comes on the head of the screw.

Thus constructed and applied, it will be seen that the pintle does not come in contact with the screw-head C; that it requires no taper; that the screw-head requires no countersink; that it is more readily put in or removed by a screw-driver; that the collar G does the duty of supporting the bulk of the weight, as well as of permitting the free revolution within it of the pintle; that the wear, instead of being all centered on the tip of the pintle and on the screw-head, is distributed over the surface where the collar and pintle are in contact; hence the wear will be less and more gradual, and the caster more durable, as well as capable of acting more efficiently when the furniture is very heavy.

What I claim, and desire to secure by Letters Patent, is—

A collar, G, placed at and projecting beyond the end of the pintle D, and serving as a bearing on the shoulder of the pintle at one end, and bearing on the screw C or end of the socket at its other end, taking its proportionate weight of the furniture, the collar being held in place and kept from turning by friction induced by one or more slots, *h*, cut in it, allowing the collar to be contracted against the interior of the socket when placed in position, substantially as shown and described.

JOHN T. CODMAN.

Witnesses:
 K. H. CODMAN,
 W. HARPER, Jr.